United States Patent
Galli et al.

(10) Patent No.: US 11,346,532 B2
(45) Date of Patent: May 31, 2022

(54) WEAPON MOUNTED LIGHT AND OPERATION THEREOF

(71) Applicant: Emissive Energy Corp., North Kingstown, RI (US)

(72) Inventors: Robert D. Galli, North Kingstown, RI (US); Chris O'Brien, North Kingstown, RI (US); Kevin Okruta, North Kingstown, RI (US)

(73) Assignee: Emissive Energy Corp., North Kingstown, RI (US)

( * ) Notice: Subject to any disclaimer, the term of this patent is extended or adjusted under 35 U.S.C. 154(b) by 0 days.

(21) Appl. No.: 17/151,243

(22) Filed: Jan. 18, 2021

(65) Prior Publication Data

US 2021/0239302 A1    Aug. 5, 2021

Related U.S. Application Data

(60) Continuation of application No. 16/804,033, filed on Feb. 28, 2020, now Pat. No. 10,895,369, which is a
(Continued)

(51) Int. Cl.
| | |
|---|---|
| *F21V 21/088* | (2006.01) |
| *F21V 23/04* | (2006.01) |
| *F21L 4/00* | (2006.01) |
| *F41G 1/35* | (2006.01) |
| *F41G 11/00* | (2006.01) |
| *H05B 45/50* | (2022.01) |
| *H05B 47/16* | (2020.01) |
| *H05B 45/325* | (2020.01) |
| *H05B 45/357* | (2020.01) |
| *H05B 45/56* | (2020.01) |

(Continued)

(52) U.S. Cl.
CPC .......... *F21V 21/0885* (2013.01); *F21L 4/005* (2013.01); *F21V 23/0421* (2013.01); *F41G 1/35* (2013.01); *F41G 11/003* (2013.01); *F41G 11/004* (2013.01); *H05B 45/18* (2020.01); *H05B 45/325* (2020.01); *H05B 45/357* (2020.01); *H05B 45/50* (2020.01); *H05B 45/56* (2020.01); *H05B 47/16* (2020.01); *F21Y 2115/10* (2016.08)

(58) Field of Classification Search
CPC ................................ F41G 1/35; F41G 11/003
See application file for complete search history.

(56) References Cited

U.S. PATENT DOCUMENTS

| | | |
|---|---|---|
| 2,304,222 A | 12/1942 | Schultz |
| 5,430,967 A | 7/1995 | Woodman, III et al. |

(Continued)

*Primary Examiner* — Andrew J Coughlin
(74) *Attorney, Agent, or Firm* — Barlow, Josephs & Holmes, Ltd.; Stephen J. Holmes

(57) ABSTRACT

A flashlight assembly includes a body having a head portion at one end and an opposing tapered tail portion and a clamping assembly on a bottom side of the body. The tail portion of the body tapers rearwardly towards a tail end thereof and downwardly from an upper side towards the bottom side, such that the tail end of the tail portion merges with the bottom side of the body and forms an inclined contoured surface extending from the bottom side to the top side. A contoured switch is mounted within the inclined angled surface of the tapered tail portion, and includes a safety bail pivotably movable to selectively mechanically impede operation of the switch.

11 Claims, 16 Drawing Sheets

Related U.S. Application Data continuation of application No. 16/236,590, filed on Dec. 30, 2018, now Pat. No. 10,578,287, which is a continuation of application No. 15/949,365, filed on Apr. 10, 2018, now Pat. No. 10,208,931, which is a division of application No. 15/232,845, filed on Aug. 10, 2016, now Pat. No. 9,958,143, which is a continuation-in-part of application No. 14/592,500, filed on Jan. 8, 2015, now Pat. No. 9,874,337, which is a continuation of application No. 13/309,702, filed on Dec. 2, 2011, now Pat. No. 8,960,942.

(60) Provisional application No. 61/418,944, filed on Dec. 2, 2010.

(51) Int. Cl.
  *H05B 45/18* (2020.01)
  *F21Y 115/10* (2016.01)

(56) References Cited

U.S. PATENT DOCUMENTS

| | | |
|---|---|---|
| D398,410 S | 9/1998 | Fell et al. |
| 6,841,941 B2 | 1/2005 | Kim et al. |
| 7,015,654 B1 | 3/2006 | Kuhlmann et al. |
| D548,385 S | 8/2007 | Sharrah et al. |
| D567,894 S | 4/2008 | Sterling et al. |
| 7,534,975 B1 | 5/2009 | Sharrah et al. |
| 7,614,760 B2 | 11/2009 | Sharrah et al. |
| D612,970 S | 3/2010 | Sharrah et al. |
| 7,731,380 B2 | 6/2010 | Wu |
| 7,735,255 B1 | 6/2010 | Kincaid et al. |
| D628,323 S | 11/2010 | Matthews et al. |
| D628,324 S | 11/2010 | Matthews et al. |
| 7,905,624 B2 | 3/2011 | Bushee et al. |
| 8,439,516 B2 | 5/2013 | Kalapodas et al. |
| 8,683,733 B2 | 4/2014 | Gross et al. |
| 2003/0202345 A1 | 10/2003 | Kim |
| 2004/0140771 A1* | 7/2004 | Kim ............... H05B 45/00 315/86 |
| 2005/0122710 A1* | 6/2005 | Kim ............... F21V 23/0414 362/157 |
| 2006/0049780 A1 | 3/2006 | Hsieh |
| 2007/0025101 A1 | 2/2007 | Lawless |
| 2007/0070619 A1* | 3/2007 | Galli ............... F21V 21/0885 362/157 |
| 2007/0240355 A1 | 10/2007 | Hsu |
| 2007/0268684 A1 | 11/2007 | Chang |
| 2008/0278937 A1 | 11/2008 | Bono |
| 2008/0291667 A1 | 11/2008 | Bushee et al. |
| 2009/0122527 A1 | 5/2009 | Galli |
| 2009/0147506 A1 | 6/2009 | Robinson |

* cited by examiner

WEAPON MOUNTED LIGHT AND OPERATION THEREOF

CROSS-REFERENCE TO RELATED APPLICATIONS

This application is a continuation of U.S. application Ser. No. 16/804,033, filed Feb. 28, 2020, which is a continuation of U.S. application Ser. No. 16/236,590, filed Dec. 30, 2018, now U.S. patent Ser. No. 10/578,287, issued Mar. 3, 2020, which is a continuation of U.S. application Ser. No. 15/949,365, filed Apr. 10, 2018, now U.S. patent Ser. No. 10/208,931 issued Feb. 19, 2019, which is a division of U.S. application Ser. No. 15/232,845, filed Aug. 10, 2016, now U.S. Pat. No. 9,958,143, issued May 1, 2018, which is a continuation-in-part of U.S. application Ser. No. 14/592,500 filed Jan. 8, 2015, now U.S. Pat. No. 9,874,337, issued Jan. 23, 2018, which is a continuation of U.S. application Ser. No. 13/309,702, filed Dec. 2, 2011, now U.S. Pat. No. 8,960,942, issued Feb. 24, 2015, which is a non-provisional of and claims priority to earlier filed U.S. Provisional patent Application No. 61/418,944, filed Dec. 2, 2010, the entire contents of which is incorporated herein by reference.

BACKGROUND OF THE INVENTION

The present invention relates generally to a multi-function flashlight assembly that is configured in a manner that includes an integrated weapon mounting interface. More specifically, the present invention relates to a compact, high intensity, multi-purpose flashlight assembly that includes a high level of functionality in connection with an integrated weapon mounting interface, thereby making the flashlight capable of being utilized as an accessory for a variety of devices such as standard military style rail type mount, for example.

In the prior art, flashlights for use in military applications have typically been constructed in a standard fashion utilizing a tubular outer housing. As a consequence, in order to facilitate mounting of the flashlight onto other devices, such as military weapons, a relatively large mounting assembly was required. Usually, the prior art mounting assembly that is used in connection with a flashlight having conventional construction includes a heavy gauge band that is wrapped around the entire outer housing of the flashlight. In addition, these bands include projections from at least one side where a large thumbscrew is positioned to allow a user to tighten the band around the flashlight. The difficulty encountered with this construction is that in some cases it creates a greater opportunity for the flashlight and mounting assembly to be caught on clothing or brush while the firearm is being carried, thereby knocking the flashlight out of alignment, dislodging the flashlight from the firearm or damaging the flashlight. Further, the interface between the outer tubular housing and the mounting band leaves the potential that the flashlight may slide or rotate within the band requiring frequent repositioning. While this may be acceptable for a sport type firearm, it is not acceptable for a firearm employed for field use, such as hunting or combat environments where immediate, fully aligned use of the flashlight assembly is required.

Actuation of a flashlight retained in such a manner on the fire arm required a user to press a button at the rear of the flashlight in an axial manner. Such pressure not only contributes to the displacement of the flashlight within the mounting band but also requires a user to move their thumb in an awkward manner to operate the flashlight.

Other difficulties with such flashlights include the fact that they were typically single function devices that had to be exchanged for a different flashlight should the need for an additional function arise, such as for example, in infra-red applications. In these situations, the user must carry several different lighting devices with them so that, as the need arises, the user can exchange lighting devices. In addition, should a flashlight include multi-functional features, often the controls are small and fussy making them difficult to operate in the typical military environment where the user is often wearing gloves. In these applications small buttons, sliders and knobs are nearly impossible to operate in a reliable fashion.

Accordingly, there is a need for an assembly that provides an improved method of compactly and reliably mounting a flashlight onto a firearm. There is a further need for a flashlight assembly that is multi-functional, easy to operate and provides an improved engagement method for firearms that has the ability to consistently and quickly engage, and provide accurate alignment, while providing a reduced profile, thereby reducing potential interference with other devices and attachments. There is a further need for a device that provides multi-functionality in an improved flashlight construction that is easier to operate and exhibits a high degree of reliability even in the most rugged environment.

BRIEF SUMMARY OF THE INVENTION

In this regard, the present invention provides for a novel flashlight assembly that includes an interface integrated into the housing thereof to facilitate mounting of the flashlight to the dovetail rail on a modern combat weapon. Generally, the outer body of the flashlight includes a head mounted to a flashlight body at one end and a tapered tail extending outwardly at the other end of the body. Further, the flashlight includes protrusions extending from the side of the body for interfacing the flashlight with a firearm. It is preferable that the outer housing of the flashlight includes such a clamping interface that is a seamless and integrated feature of the outer housing of the flashlight itself.

The operational modes of the flashlight are controlled by a single push button and a selector switch. To facilitate a highly compact design the flashlight employs two circuitry arrangements positioned remote from one another and in communication with one another via a single conductive trace. The push button consists of a single momentary switch while the selector includes a magnet and a Hall Effect sensor that operate together to toggle between an open and closed position. In this manner the selector switch, when moved between an open and closed position, provides a signal to the circuitry at the rear of the flashlight to operate at a first signal frequency or a second signal frequency.

An exemplary embodiment of the flashlight includes a bistable safety bail to prevent inadvertent depression of an operational push button switch and a bistable pivoting mode selection lever which controls operational modes of the flashlight. Further, the flashlight operates with a thermal optimization circuit which automatically, over time, reduces a duty cycle of the control circuit to reduce the temperature of the LED junction, improving LED performance and increasing battery life.

Accordingly, it is an object of the present invention to provide a flashlight having a mounting interface that is integrated into the construction and provides an improved method of compactly and reliably mounting a flashlight onto a firearm. It is a further object to provide a flashlight having unique safety features to prevent inadvertent depression of the actuator buttons and a reliable selection of operational modes. It is still a further object to provide a flashlight with a thermal optimization circuit that improves LED performance and increases battery life.

BRIEF DESCRIPTION OF THE DRAWINGS

In the drawings which illustrate the best mode presently contemplated for carrying out the present invention.

DETAILED DESCRIPTION OF THE INVENTION

Figure 1:
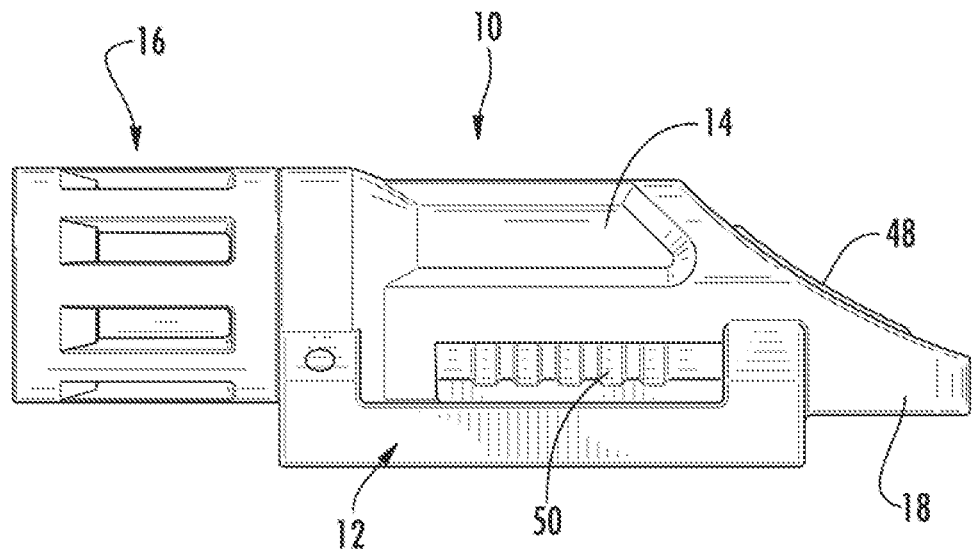
FIG. 1 is a side view of the flashlight assembly of the present invention.
Figure 2:
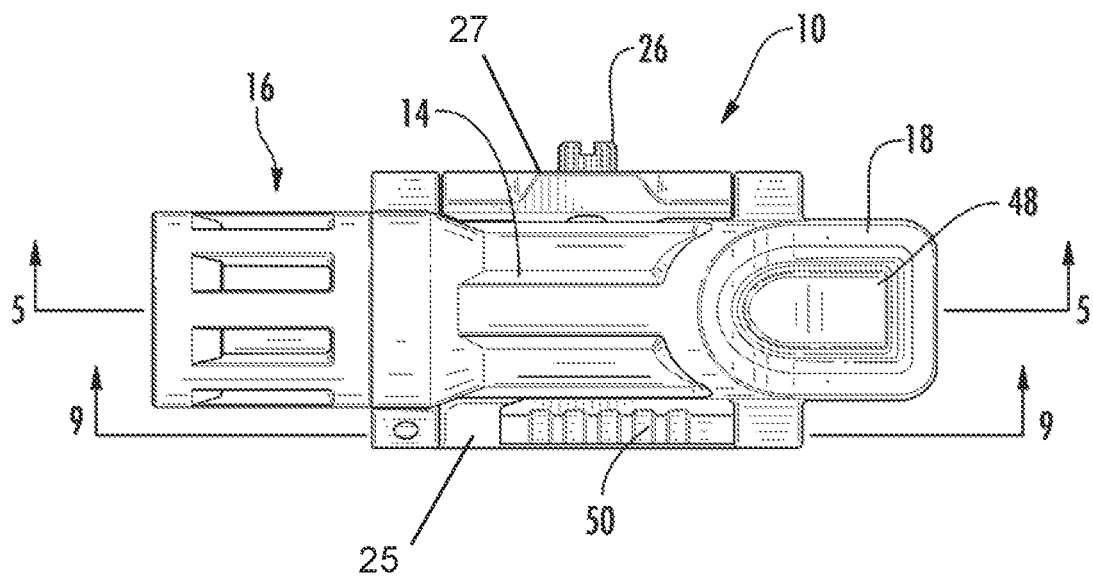
FIG. 2 is a top view of the flashlight assembly of the present invention.

Now referring to the drawings, a flashlight assembly is shown and generally illustrated in the figures. As can be seen in FIGS. 1 and 2, the flashlight assembly 10 includes a clamping interface 12 which is integrated into the housing 14 to facilitate mounting of the flashlight 10 to a dovetail rail on a modern combat weapon. Generally, the flashlight includes a head portion 16 mounted at one end of the flashlight body 14. A tapered tail portion 18 extends outwardly at the other end of the body. Further, the flashlight 10 includes protrusions extending from the side of the body that serve as an integrated interface 12 for interfacing the flashlight 10 with a firearm.

Figure 3:
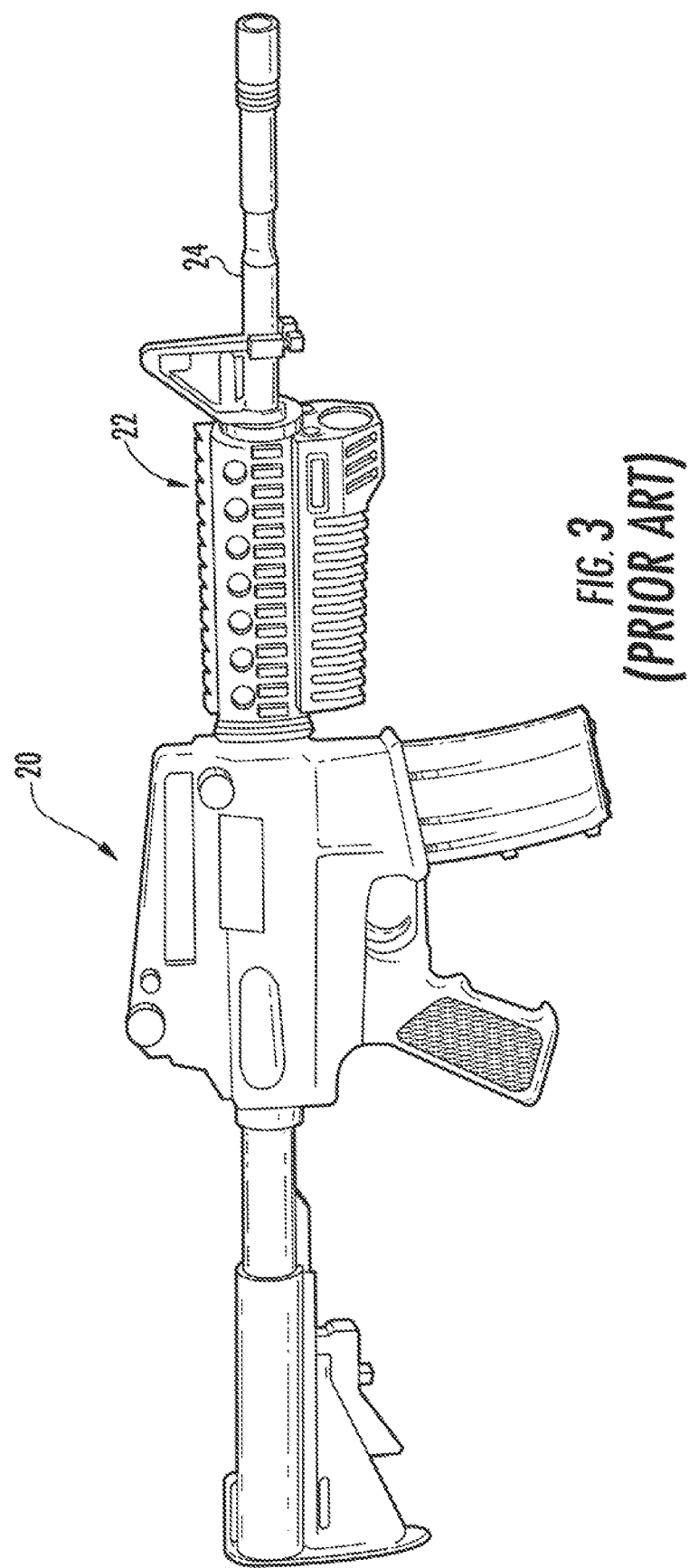
FIG. 3 is a prior art combat firearm.

As depicted at FIG. 3, modern type firearms 20 generally include an interface rail integrated 22 thereon for the mounting of auxiliary devices. Additionally, there are several supplemental rail systems 22 that mount onto such firearms 20 and extending along and around the barrel 24 to provide additional interface rails 22 both along the top of the firearm 20 as well as at the 3, 6 and 9 o'clock positions around the barrel 24. All of the interface rails 22 have a standardized profile and are configured specifically for the mounting of various accessories depending on the type environment in which the firearm will be used. The outer housing 14 of the flashlight 10 includes complementary clamping interface generally indicated 12 that is a seamless and integrated feature of the outer housing 14 of the flashlight 10.

Figure 4:
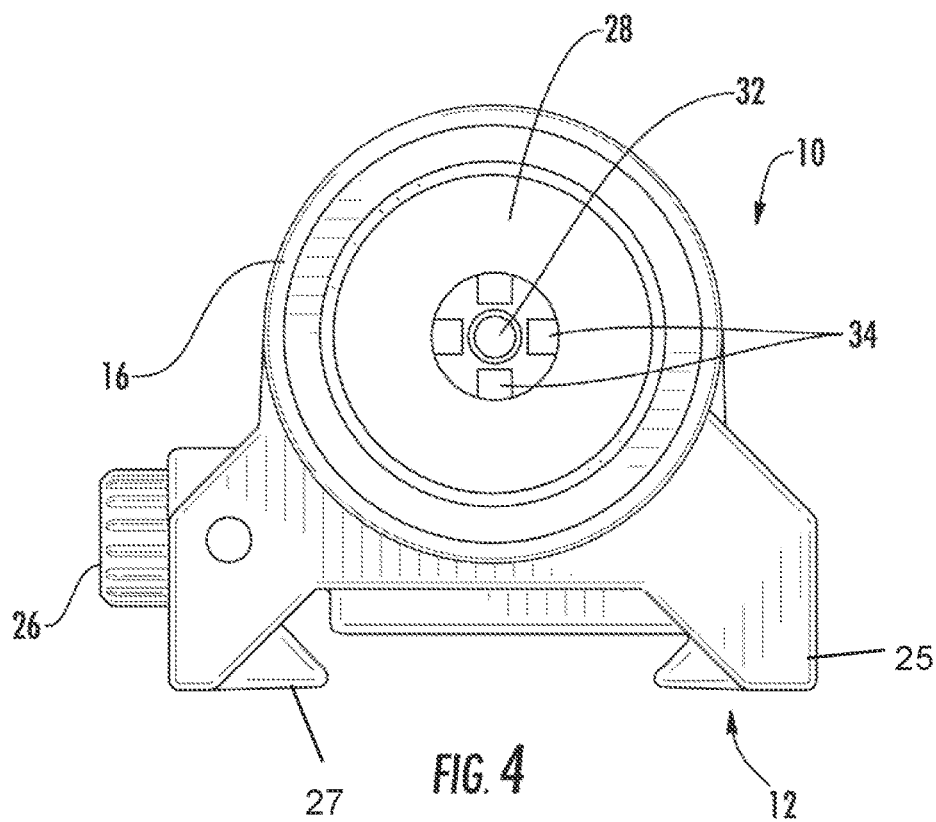
FIG. 4 is a front view of the flashlight assembly of the present invention.

As can be seen at FIG. 4, when the flashlight assembly 10 is mounted onto a firearm 20 the lower portion of the clamping interface 12 is a dovetail 25 that is formed as a rigid profile in the housing 14. The clamping interface 12 is slid onto the firearm accessory rail 22 and retained in place with a complementary, spring loaded movable dovetail element 27 and a locking set screw 26. In the alternative, the clamping interface 12 may include a single tightening mechanism (not shown) that engages the flashlight housing 14 and the clamping interface 12 at the same time. Similarly, the clamping interface 12 may have a separate dedicated clamping member (not shown) for the interface. The tightening mechanisms for both the clamping arm and the dovetail interface may be set screws, thumb screws, quick release type mechanisms, spring loaded clamps or combinations thereof to allow easy mounting and demounting of the flashlight 10 relative to the firearm 20. Further, other types of locking mechanisms (not shown) may be provided to prevent accidental disengagement of the flashlight 10 from the rail 22.

Figure 5:
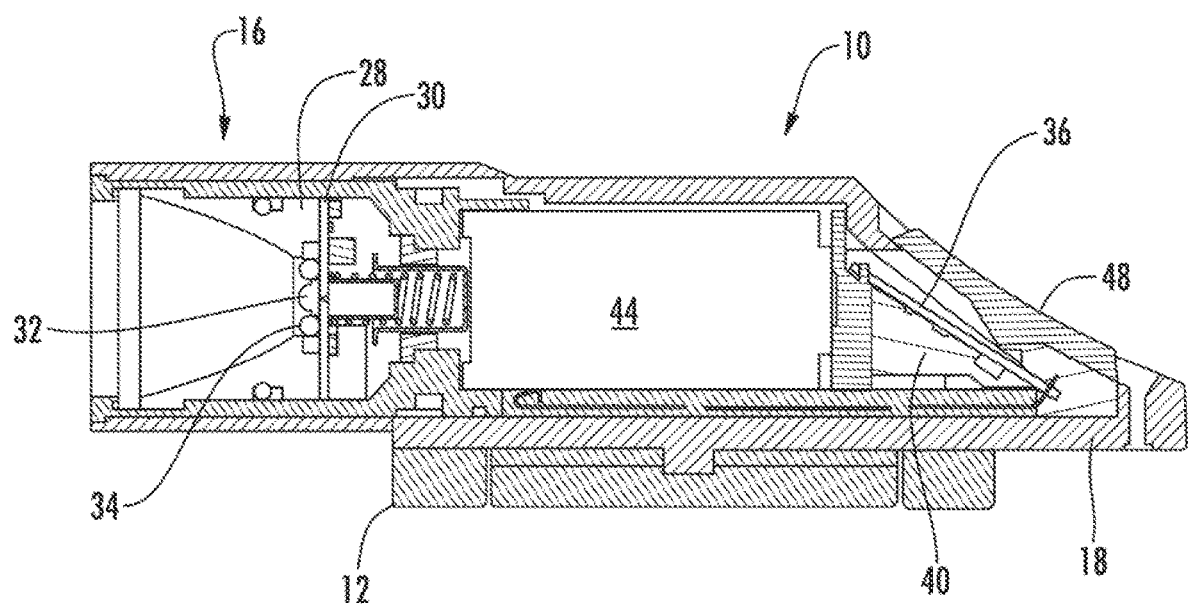
FIG. 5 is a cross-sectional view taken along the line 5-5 of FIG. 2.
Figure 6:
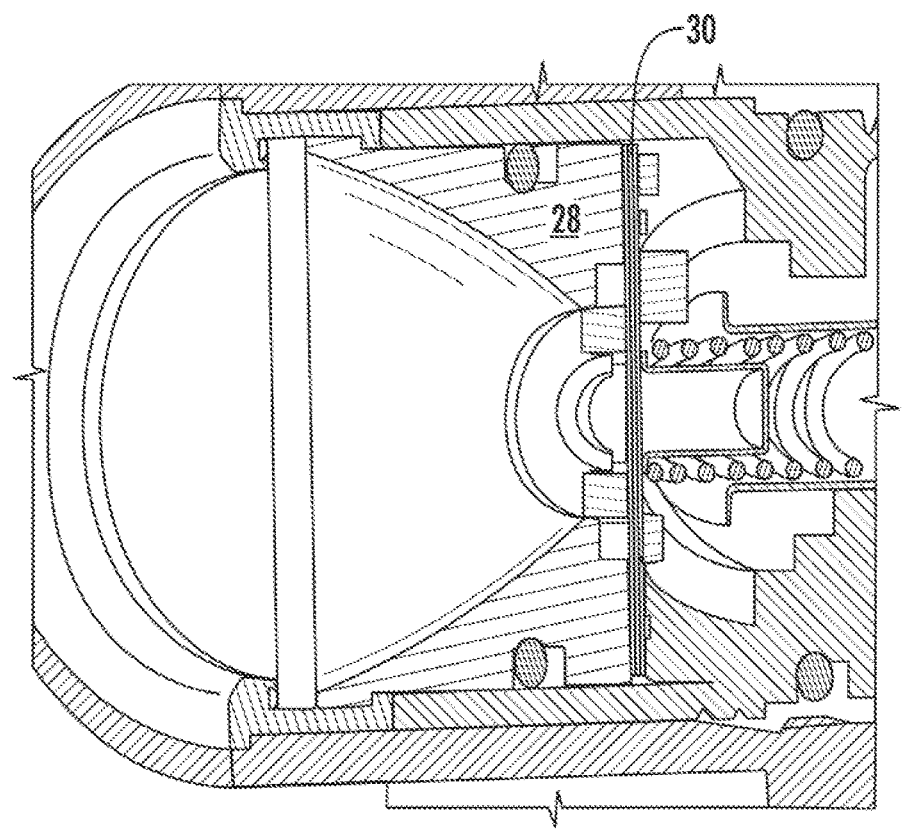
FIGS. 6 and 6a are cross-sectional views of the flashlight head portion.
Figure 7:
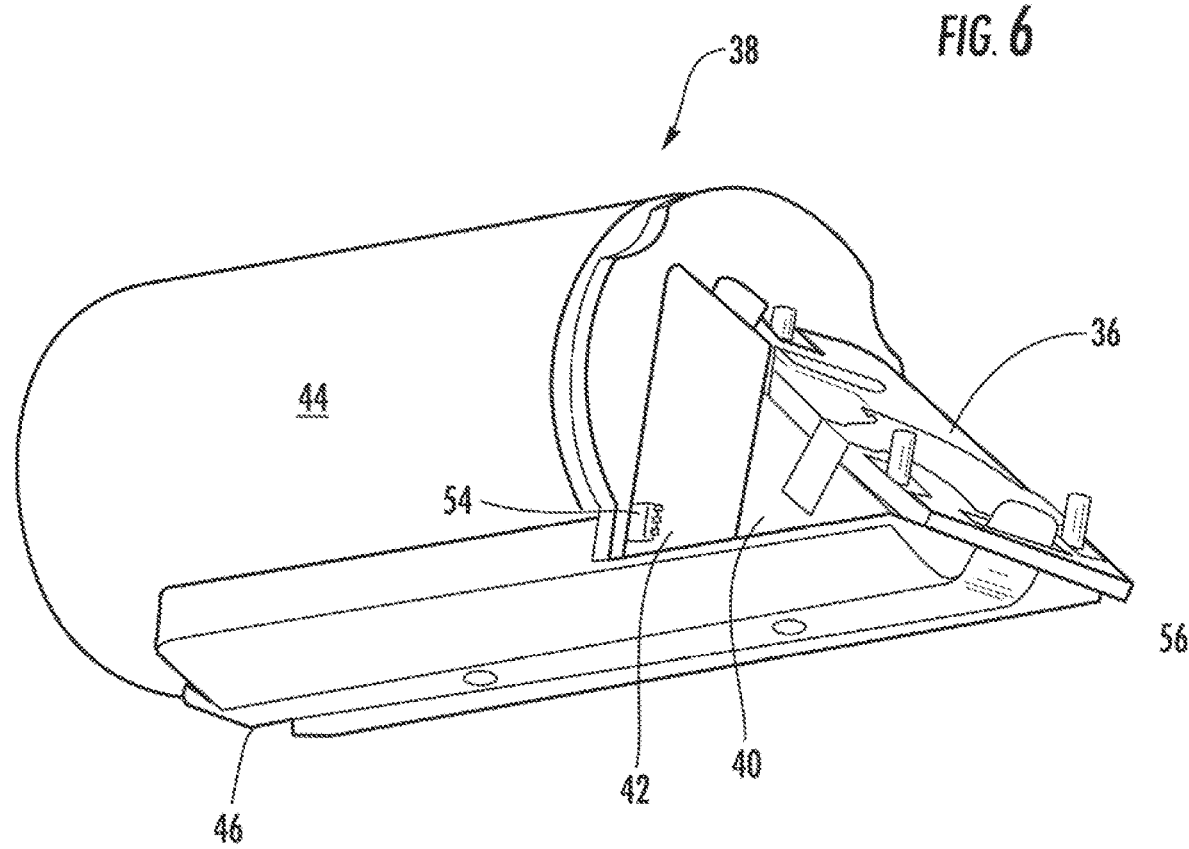
FIG. 7 is a perspective view of the internal cartridge of the flashlight.
Figure 6A:
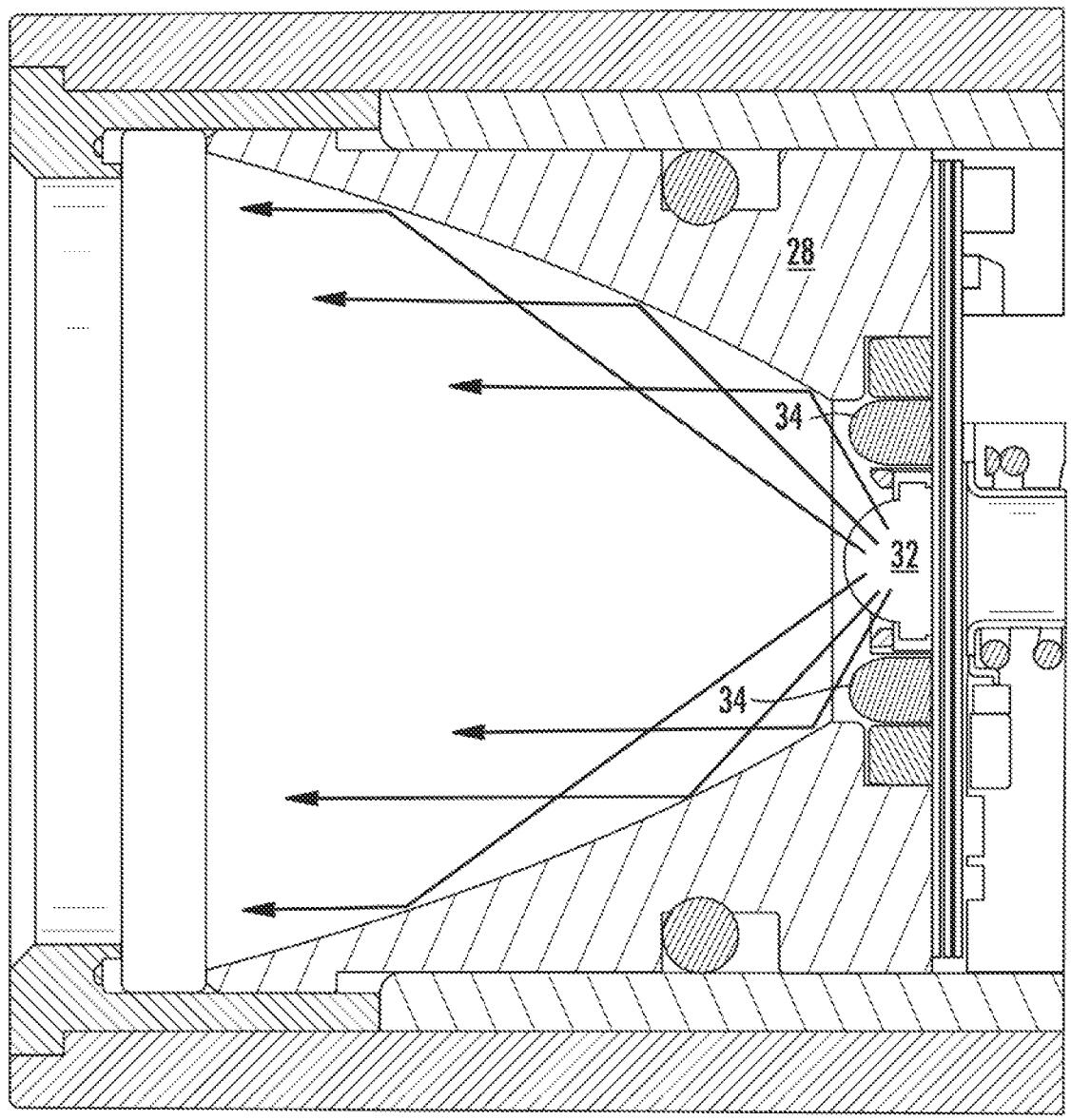
Figure 8:
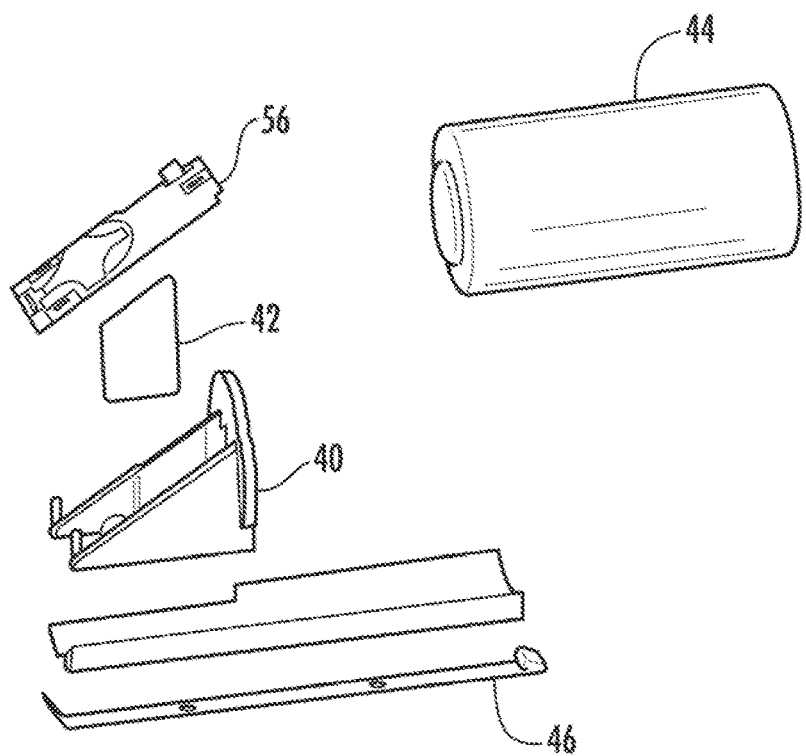
FIG. 8 is an exploded perspective view of the internal cartridge of the flashlight.

Turning to FIGS. 4-6, within the head portion 16, there is a composite heatsink/reflector assembly 28 which collects and dissipates the waste heat generated during operation of the flashlight 10. Adjacent a rear surface of the heatsink 28 is a circuit board 30 that includes an array of at least two LEDs 32,24 positioned thereon. In the preferred embodiment the LEDs include a visible white LED 32 positioned centrally within the reflector and one or more infra-red LEDs 34 positioned adjacent the white LED 32 and at the periphery of the opening in the reflector 28. This arrangement facilitates the use of a dual operational mode where the output of the LEDs 32,34 is maximized regardless of the mode in which the flashlight is being operated. In the prior art, vias were created within the surface of the reflector to allow light from ancillary LEDs to emit through the same lens as the light from the primary LED. However, in such an arrangement, the vias created an interruption in the surface of the reflector, causing dark spots in the light output of the primary LED. In the arrangement of the present invention, the white LED 32 is positioned such that all of the light emitted therefrom passes above the level of the front of the ancillary LEDs 34 and is captured and projected forward by the reflector (see FIG. 6a). The output from the ancillary infra-red LEDs is captured by the optic on each of the infra-red LEDs 34 themselves and is directed forward in a relatively narrow beam such that the output does not impinge on either the white LED 32 or the reflector 28 surface. It should be appreciated that while in this description the ancillary LEDs 34 are referred to as being infra-red and the primary LED 32 is described as being white, such a description is for illustration purposes and description of a preferred embodiment. It should be understood by one skilled in the art that any arrangement and variation of LEDs and colors could be substituted for the white and infra-red color scheme and still fall within the scope of the present disclosure.

As can best be seen in FIGS. 5-8, a cross section of the flashlight 10 of the present invention is shown. Within the tail portion 18 of the flashlight 10 there is a switching mechanism 36 positioned and supported at an angle relative to the central longitudinal axis of the flashlight 10. The switching mechanism 36 controls selective operation of the flashlight 10. Generally, the internal operational components of the flashlight are contained and supported on a cartridge insert 38 (shown at FIG. 7) that holds and supports the switching mechanism 36 on an angled die cast platform 40. Also mounted on the cartridge insert 38 is a sensor circuit 42 to switch operational modes of the flashlight, a power source (battery) 44 contained within the rear portion of the housing 14 and an electrically conductive strap 46 to return power from the head portion and complete the circuit between the front and rear of the flashlight 10.

The operational modes of the flashlight 10 are controlled by a single push button actuator 48 and a selector switch 50. The actuator outer surface may be flush with and/or follow the contour of the tapered tail portion. To facilitate a highly compact design, the flashlight 10 employs two circuit board arrangements. As described above, a first circuit board 30 is located at the front of the flashlight 10 within the head portion. A second circuit board 56 is positioned at the rear, remote from the front circuit board 30. The circuit board 30 and 56 are in communication with one another through the battery 44.

The push button actuator 48 consists of a single momentary switch while the selector 50 includes a magnet 52 and a Hall Effect sensor 54 that operate together to toggle between an open and closed position. In this manner the selector switch 50, when moved between an open and closed position, provides a signal to the circuit board 56 of the flashlight to instruct the flashlight to operate at a first signal frequency or a second signal frequency using Pulse Width Modulation (PWM). Pulse Width Modulation, or PWM, is a technique for getting analog results with digital means. Digital control is used to create a square wave, a signal switched between on and off. This on-off pattern can simulate voltages in between full on (5 Volts) and off (0 Volts) by changing the portion of the time the signal spends on versus the time that the signal spends off. The duration of "on time" is called the pulse width. To get varying analog values, you change, or modulate, that pulse width. If you repeat this on-off pattern fast enough with an LED for example, the result is as if the signal is a steady voltage between 0 and 5 v controlling the brightness of the LED. This is also called a duty cycle.

The duty cycle is transmitted from the second circuit board 56, through the battery 44, to the second circuit board 30 at the head of the flashlight. When the circuit board 30 at the head 16 of the flashlight 10 receives the first frequency signal (pulse width) it operates by illuminating the white LED 32 in accordance with the operational instructions.

Similarly, when the circuit board 30 at the head 16 of the flashlight 10 receives the second frequency signal (pulse width) it operates by illuminating the infra-red LEDs 34 in accordance with the operating instructions. It is of note that when moving the selector switch 50 the flashlight includes an instruction to power off the LEDs 32,34 until a new operating instruction is received from the push button 48. This prevents the accidental switching from infra-red to visible white light simply by bumping the selector switch 50 while the flashlight is in an on mode.

In addition to using PWM to toggle the selection of light sources, the present invention also provides additional operational modes such as high illumination, low illumination and strobe by way of example. These modes are known in the art and do not require further illustration herein. However, many users have a preference as to the manner in which the various operational modes are presented or arranged. For example, some users do not want a strobe function. The present invention allows the toggling on or off of various modes to allow customization of the flashlight operational modes. For example, if the user places the flashlight into strobe mode and then fully de-powers the light (by partially removing the flashlight head), holding the rear push button as the light is powered up will cause the strobe mode to be dropped from the operational modes menu. If the flashlight is again fully de-powered and the push button is held while the light is powered up, strobe functionality will again be toggled on. Similarly, other functions may be toggled on or off or their operation reversed such as making high or low illumination the first menu selection.

Figure 9:
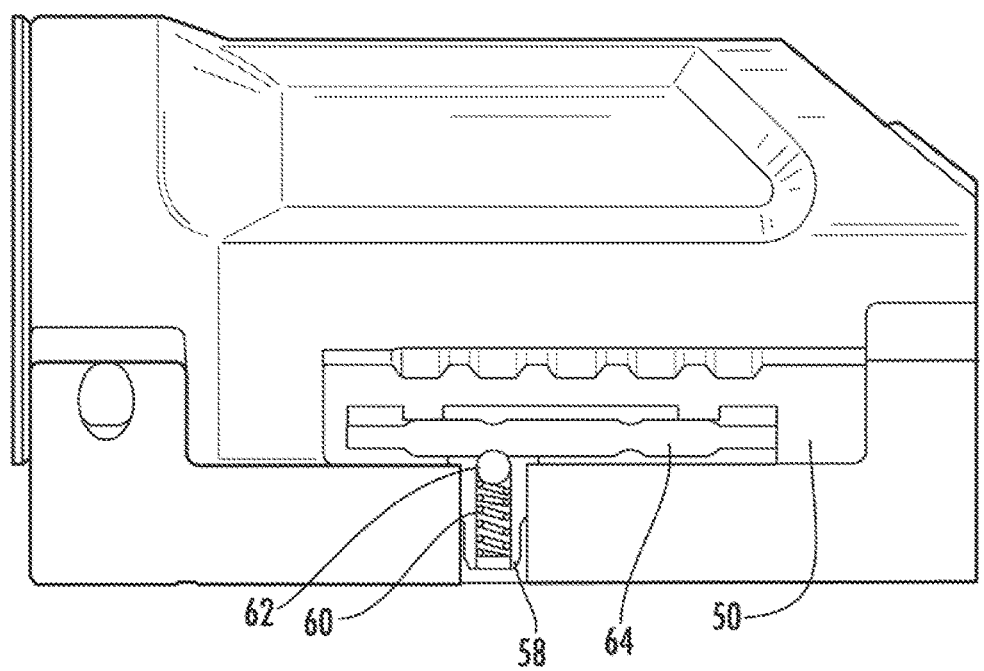
FIG. 9 is a cross-sectional view taken along the line 9-9 of FIG. 2.
Figure 10:
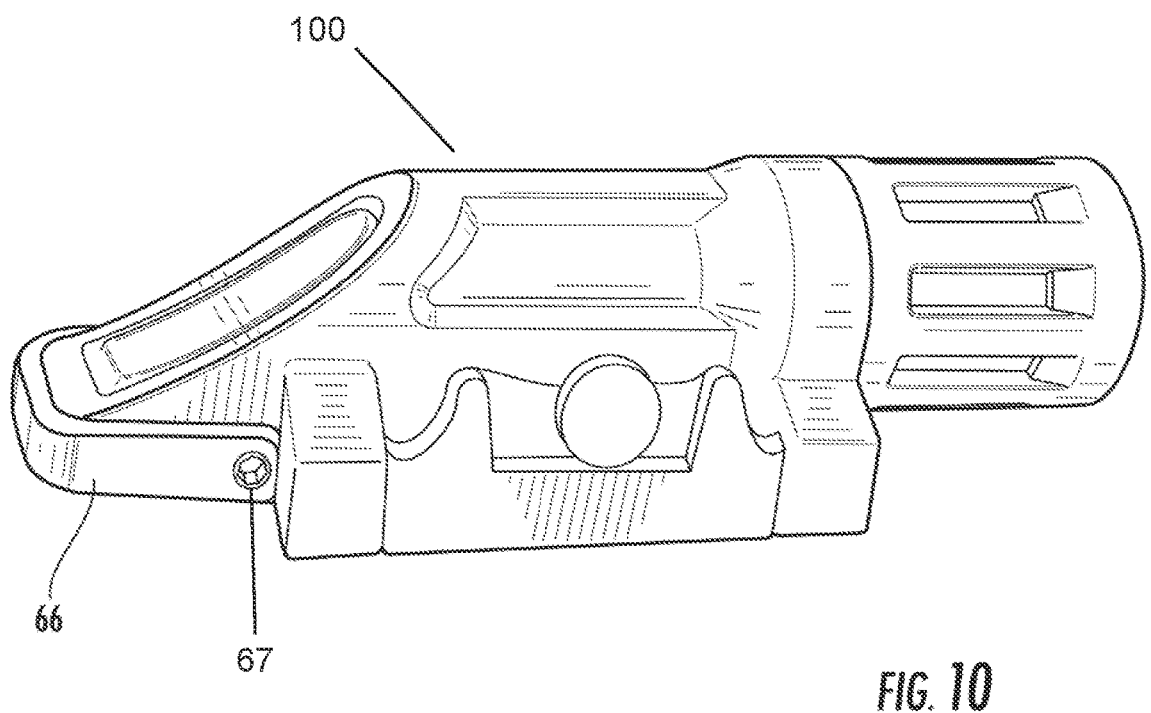
FIG. 10 is a side view of another exemplary flashlight assembly of the present invention with a safety bail and a rotating selector lever.
Figure 11:
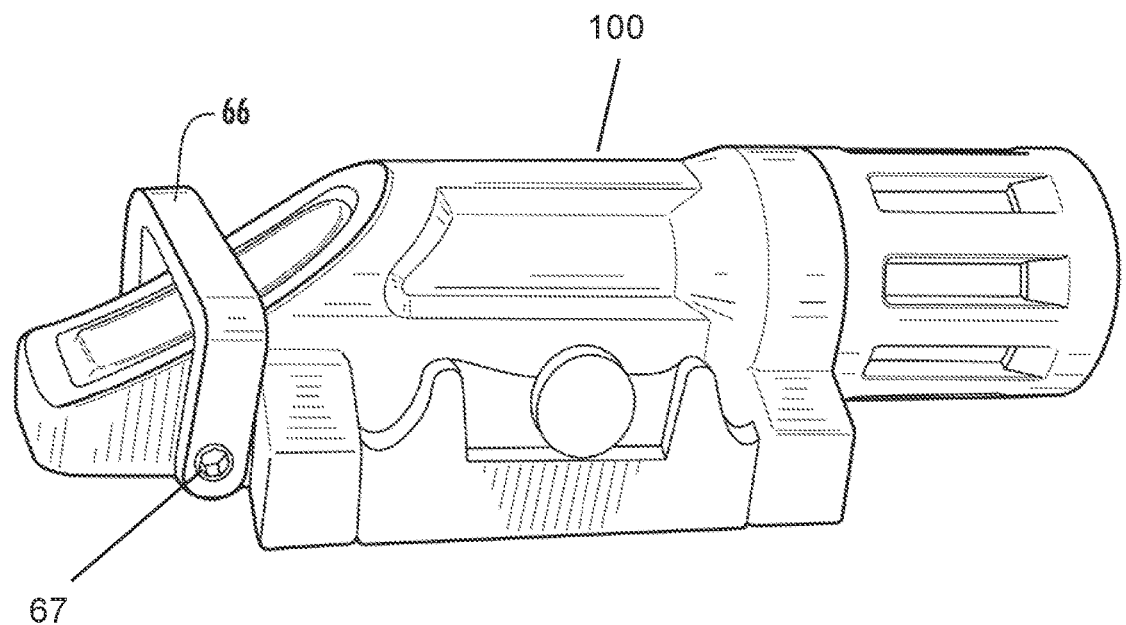
FIG. 11 is a side view thereof with the safety bail engaged.

As illustrated at FIG. 9, there is a novel manner for the attachment of the selector switch 50. In the illustrated embodiment, there is a slide switch 50 used for toggling of the illumination mode of the flashlight. A pin 58 is mounted into the flashlight housing 14 perpendicular to the direction of the slide switch motion. The pin 58 has an opening positioned axially therein to receive a spring 60 and ball detent 62. Further the pin 58 includes an opening into which a slide pin 64 is received. The slide pin 64 has detents formed in the outer surface thereof to interact with the ball detent 62 such that at least two positions of the slide pin 58 provide tactile location feedback when the ball 62 engages the detents in the outer surface thereof. A cover is then installed over the slide pin to create an actuator surface for the slide switch 50. In this arrangement all of the wearing surfaces can be formed of metal yet all of the operational forces of the ball detent arrangement are contained so that they only transfer to the slide pin preventing wear of the switch.

Turning now to FIGS. 10-13, another exemplary embodiment is illustrated and generally indicated at 100. A safety feature is provided in the form of a U-shaped bail 66 that is movable between a clear position, illustrated at FIG. 10 and a blocking position, illustrated at FIG. 11 (rotated 90 degrees upward). When rotated up into the blocking position, the bail 66 prevents the momentary switch from being accidentally depressed thereby preventing the flashlight from accidentally being energized. When the user wishes to operate the flashlight, the bail 66 can easily be rotated to the clear position to allow normal operation of the flashlight. In the illustrated embodiment, the bail 66 is retained with screws 67 which pass through the terminal ends of the legs of the bail 66 into the housing. The bail 66 is thus retained in the respective positions by friction.

Figure 12:
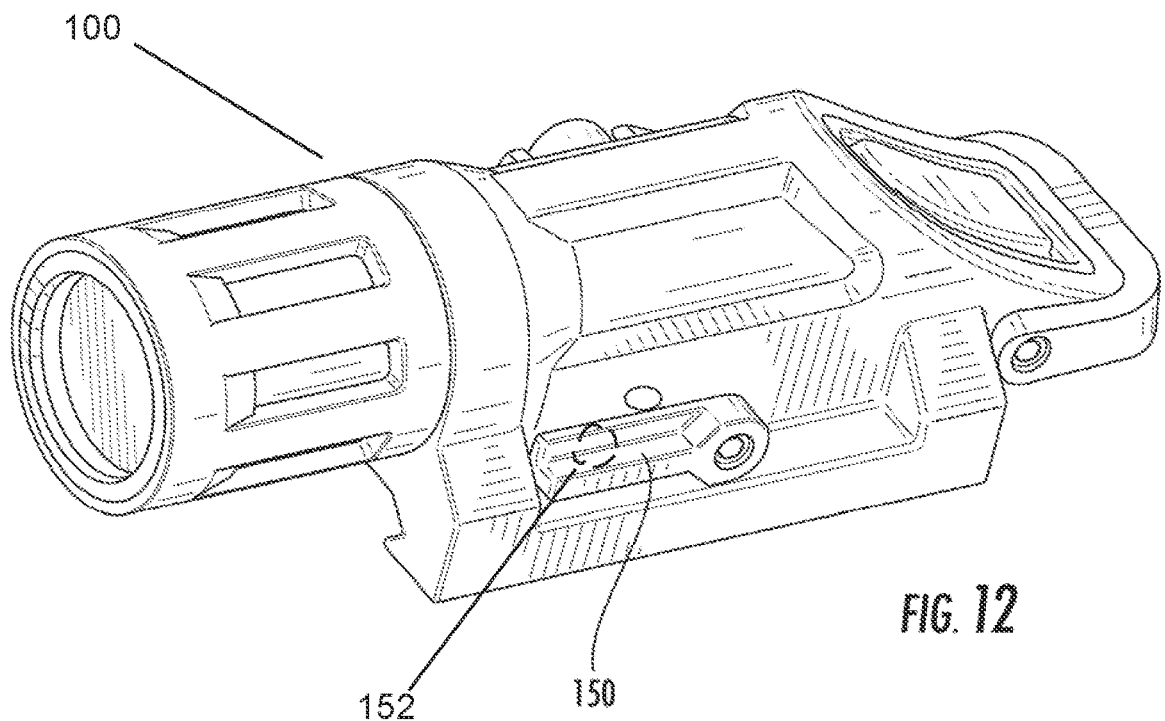
FIG. 12 is a side view thereof showing a rotating lever selector switch in a first position.
Figure 13:
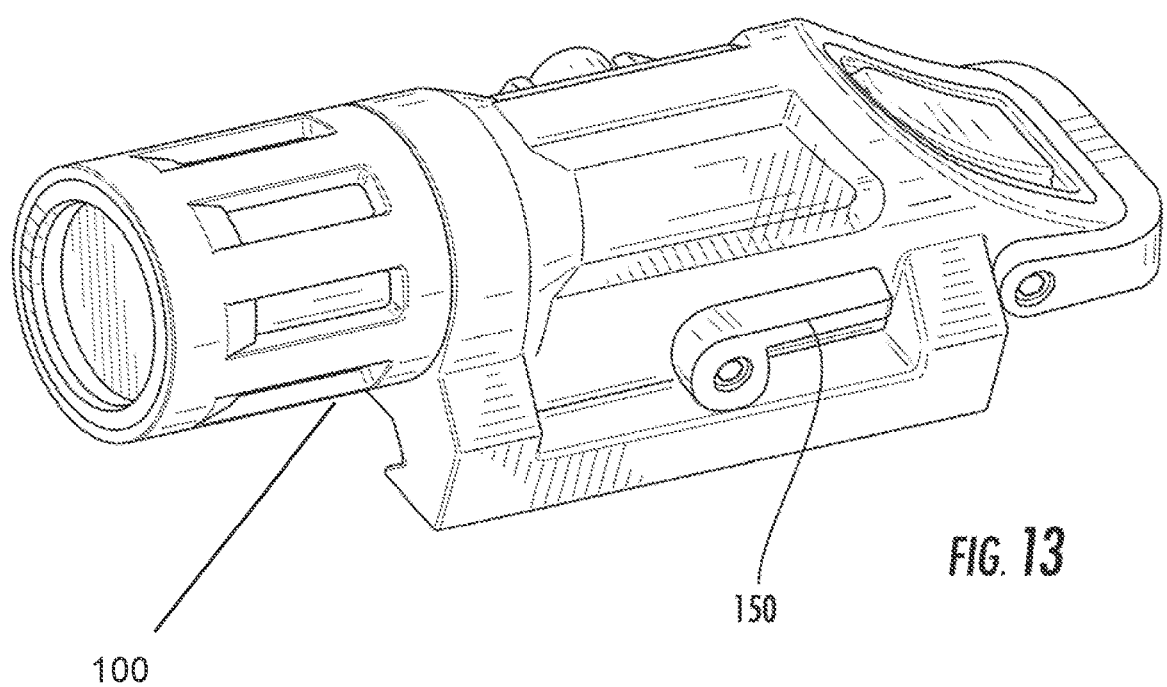
FIG. 13 is a side view thereof with the rotating selector lever in a second position.

As can be seen in FIG. 12 this embodiment includes an alternative arrangement for a selector switch 150. In this embodiment, a rotating lever 150 is used instead of a slide switch 50. This arrangement also includes a magnet 152 and a Hall Effect sensor 154 that operate together to toggle between an open (depicted at FIG. 12) and closed position (depicted at FIG. 13). In this manner the lever switch 150, when moved between an open and closed position, provides an input to the circuitry 56 at the rear of the flashlight to operate in a first mode or a second mode. Operation of the flashlight in selected mode is controlled by PWM as previously described.

Figure 14:
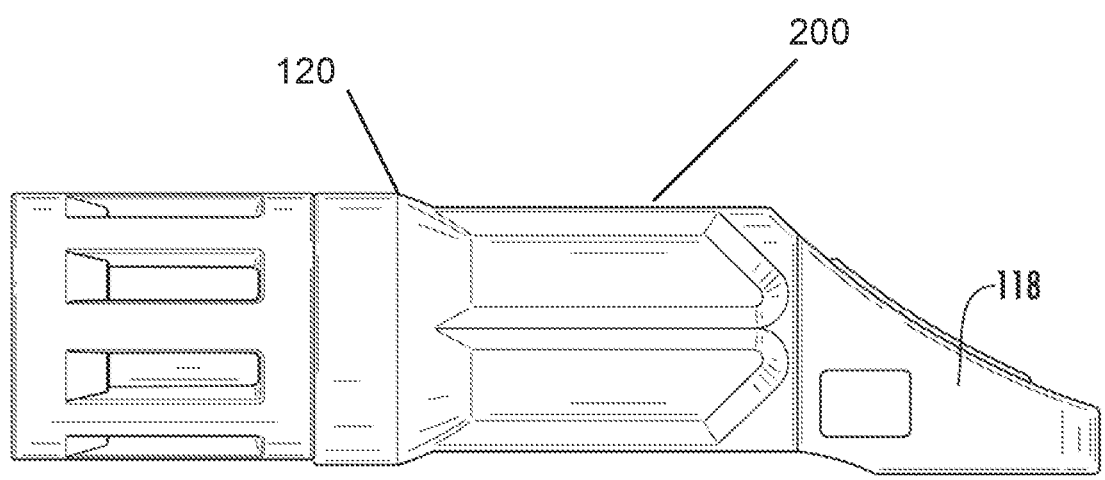
FIG. 14 is a side view of another exemplary embodiment where the operational switch is shown as a retrofit attachment for an existing flashlight body.
Figure 15:
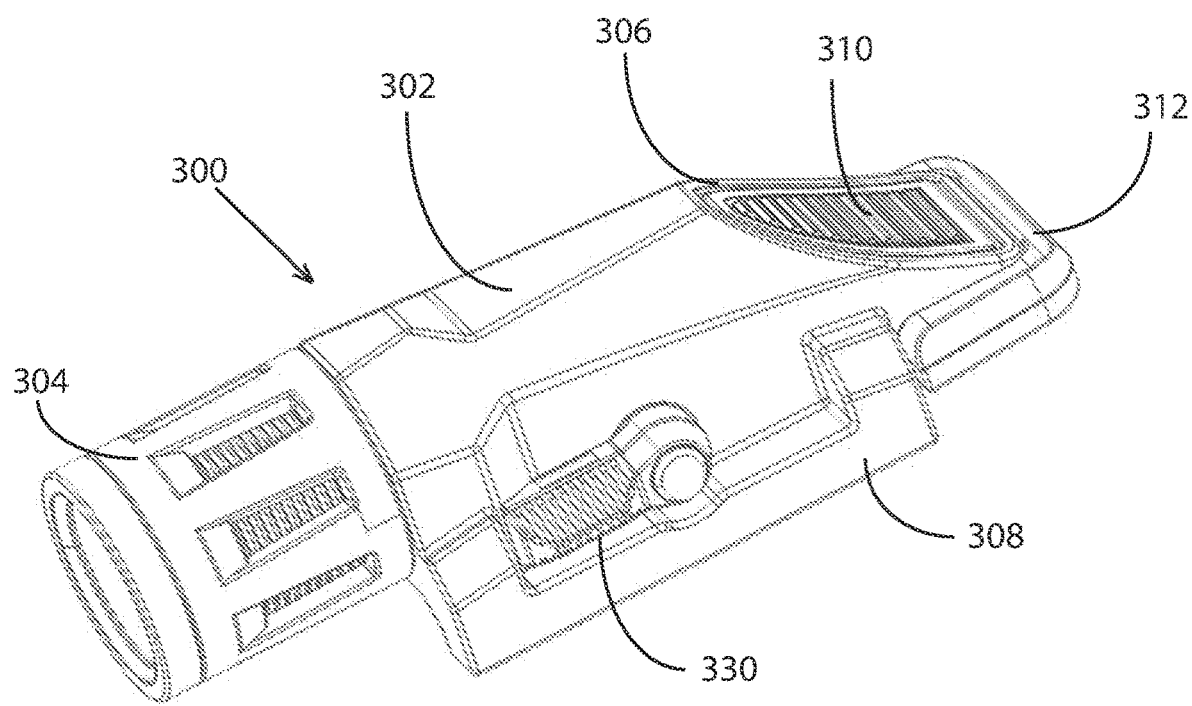
FIG. 15 is a perspective view of yet another exemplary embodiment including a safety bail with a bistable hinge and a bistable pivot selection lever.

In yet another alternate arrangement of the present invention indicated at 200, the angled push button switch assembly is provided at FIG. 14 as a retrofit attachment 118 for an existing weapon mounted flashlight 120. The details and manner in which the retrofit switch 118 affixes to the existing light 120 will vary from model to model depending on the particular construction of the light being retrofit. However, the present invention provides for a push button operator on an existing light to be removed and exchanged for an operator that is ergonomically shaped as has been discussed herein.

Turning now to FIGS. 15-25, yet a further exemplary embodiment of the invention is illustrated and generally indicated at 300. This embodiment 300 includes the same general features as earlier embodiments 10, 100, 200 with several distinguishing improvements.

The first distinguishing feature is a flexible bistable safety bail. The natural elasticity of plastic molded material of the U-shaped safety bail provides the needed axial spring load to retain the bail in position and to provide spring load to force cam lobes on the bail legs into corresponding cam valleys on the housing body. The second distinguishing feature is a bistable rotatable selection lever. The selection lever and housing have bistable cam formations to provide two distinct lever positions to select operating mode. The third distinguishing feature is a thermal optimization method which manages and optimizes the temperature of the LED junction while also improving LED performance and conserving battery power.

Turning now to the figures, the flashlight 300 comprises an elongate body 302 having a head portion 304 at one end and an opposing tapered tail portion 306. A clamping assembly 308 is located on a bottom side of the body 302 for securing the flashlight 300 to a dovetail rail 22. As in the earlier embodiments, the tail portion 304 of the body 302 tapers rearwardly towards the tail end and downwardly towards the bottom side of the body, and also as in the earlier embodiments, a push-button switch 310 is mounted within the tapered tail portion 306. The tapered tail portion 306 may have a slightly upward actuate contour which better conforms to the shape of a user's finger.

A flexible U-shaped safety bail 312 is pivotably mounted to the tapered tail portion 306 of the body 302. However, distinct from the earlier embodiments, the safety bail 312 is snap fit into position and retained in place by bistable hinge structures formed on the bail 312 and on the housing 302. More specifically, the safety bail 312 has a central portion 314 spanning a width of the body 302 and further has two opposing legs 316,318 which straddle the tail portion 306. The legs 316,318 of the safety bail 312 and the tail portion 306 of the body include cooperative bistable cam elements which provide bistable rotation of the safety bail 312 between a clear position (FIG. 15) wherein the safety bail 312 is positioned downwardly toward the bottom side of the body 302 and operation of the push-button switch 310 is unimpeded, and a blocking position (FIG. 16) wherein the safety bail 312 is positioned upwardly away from the bottom side and spans across the tapered tail portion 306 and over the push-button switch 310 such that operation of the push-button switch 310 is mechanically impeded. As noted above, the natural flexibility of the legs 316, 318 of the bail 312 provide a natural inward spring bias to retain the bail 312 in position on the tail portion 306, and also provide the needed inward spring bias during rotation of the safety bail 312 to urge the bistable cam elements into the clear and blocking positions.

Figure 16:
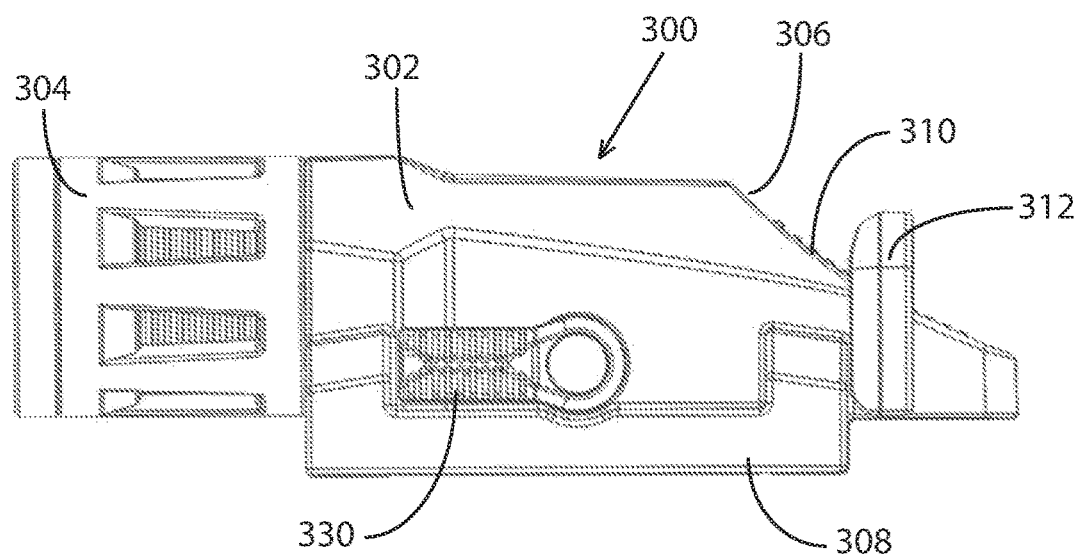
FIG. 16 is a side view thereof with the safety bail in the blocking position and the lever switch in a first position.
Figure 17:
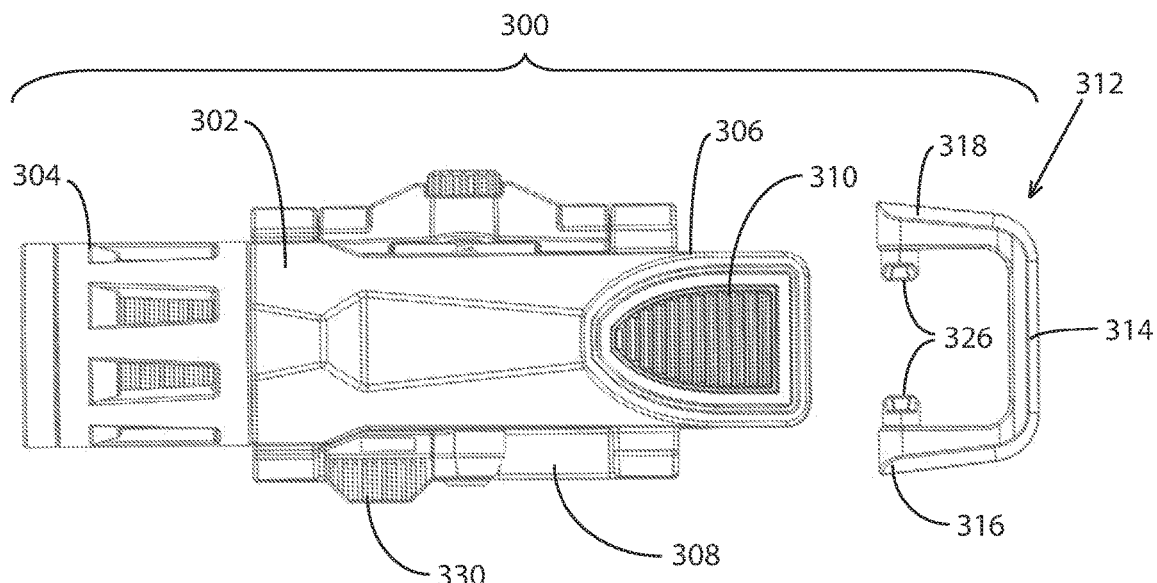
FIG. 17 is a top view thereof with the safety bail exploded.
Figure 18:
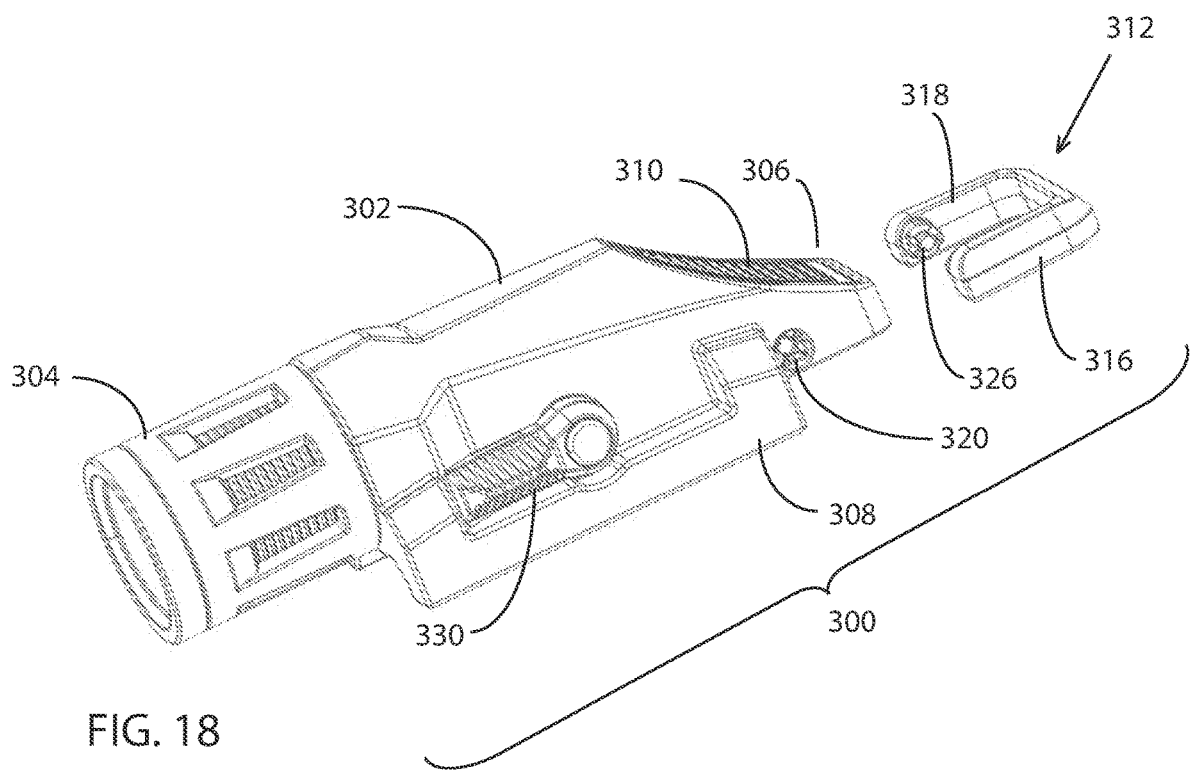
FIG. 18 is a perspective view thereof.
Figure 19:
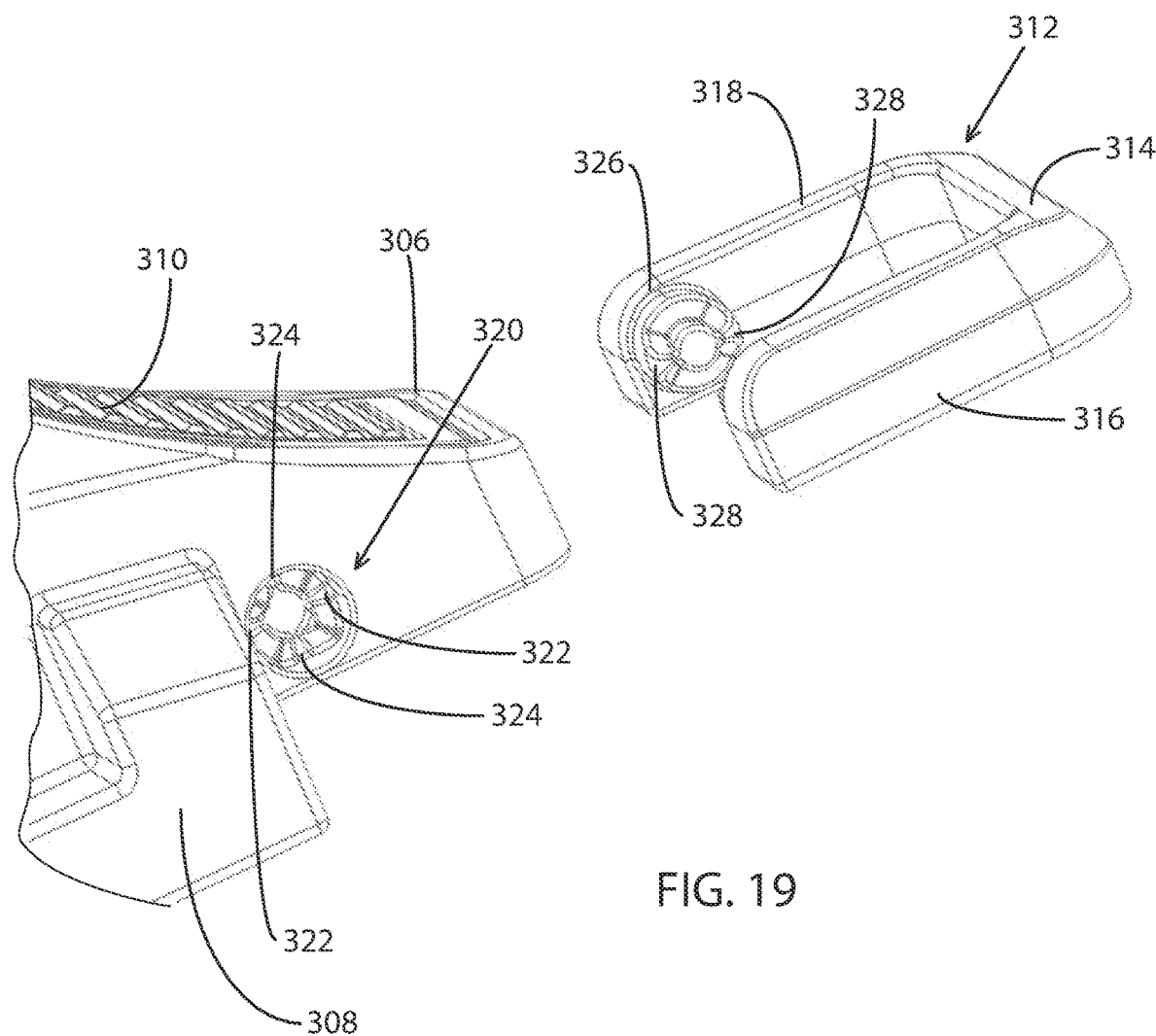
FIG. 19 is an enlarged isometric view thereof showing the bistable cam surfaces within the housing and cam follower surfaces on the bail legs.
Figure 20:
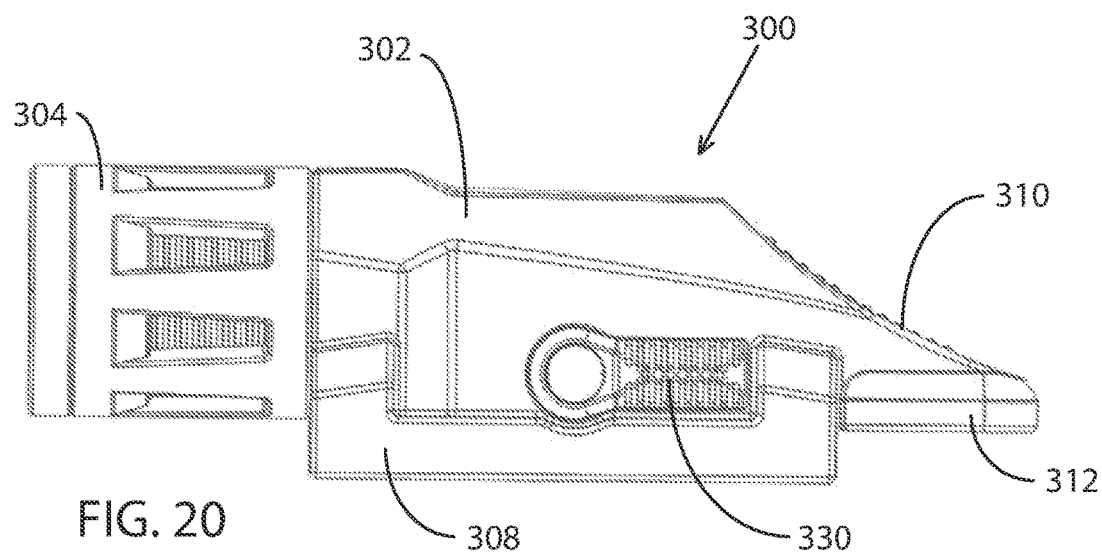
FIG. 20 is another side view thereof with the lever switch in a second position.
Figure 21:
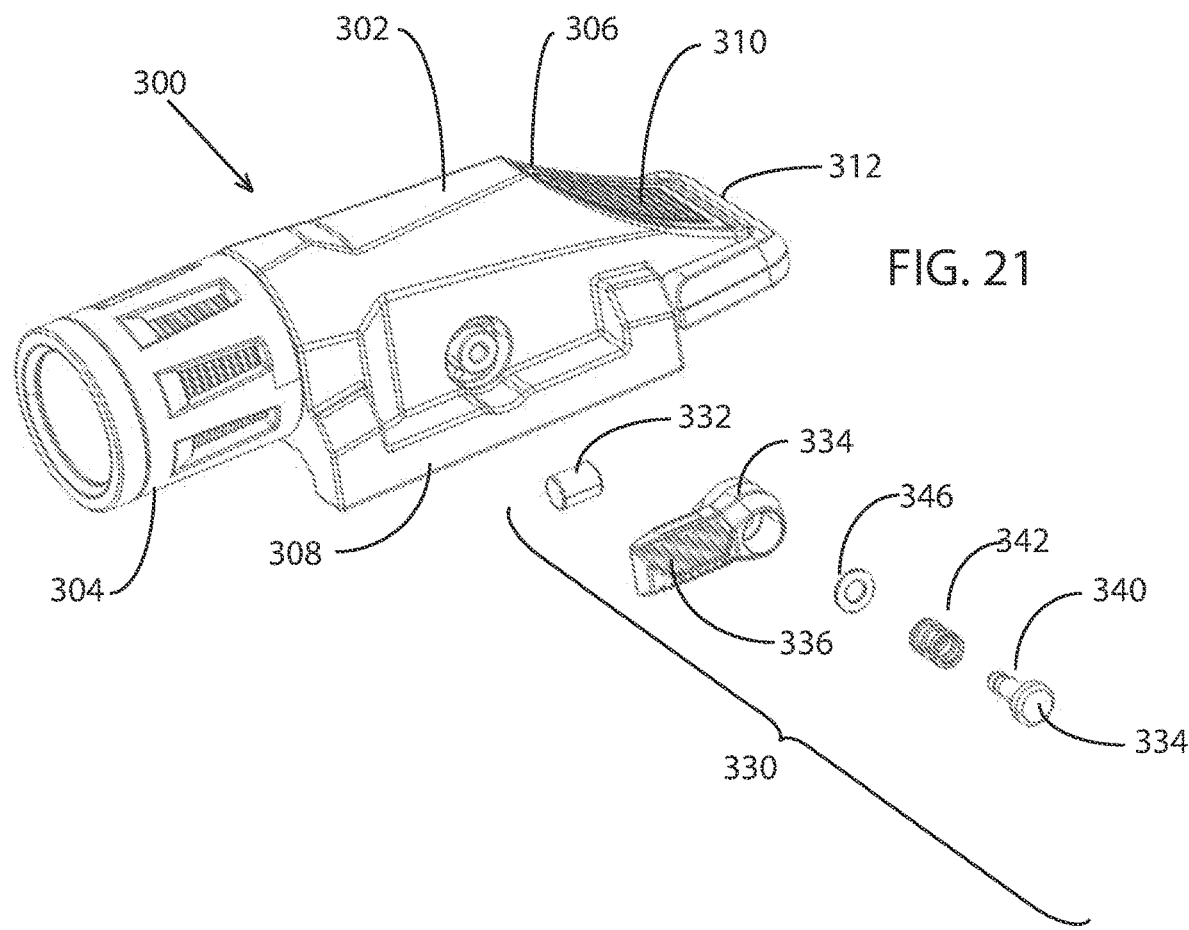
FIG. 21 is an exploded perspective thereof.
Figure 22:
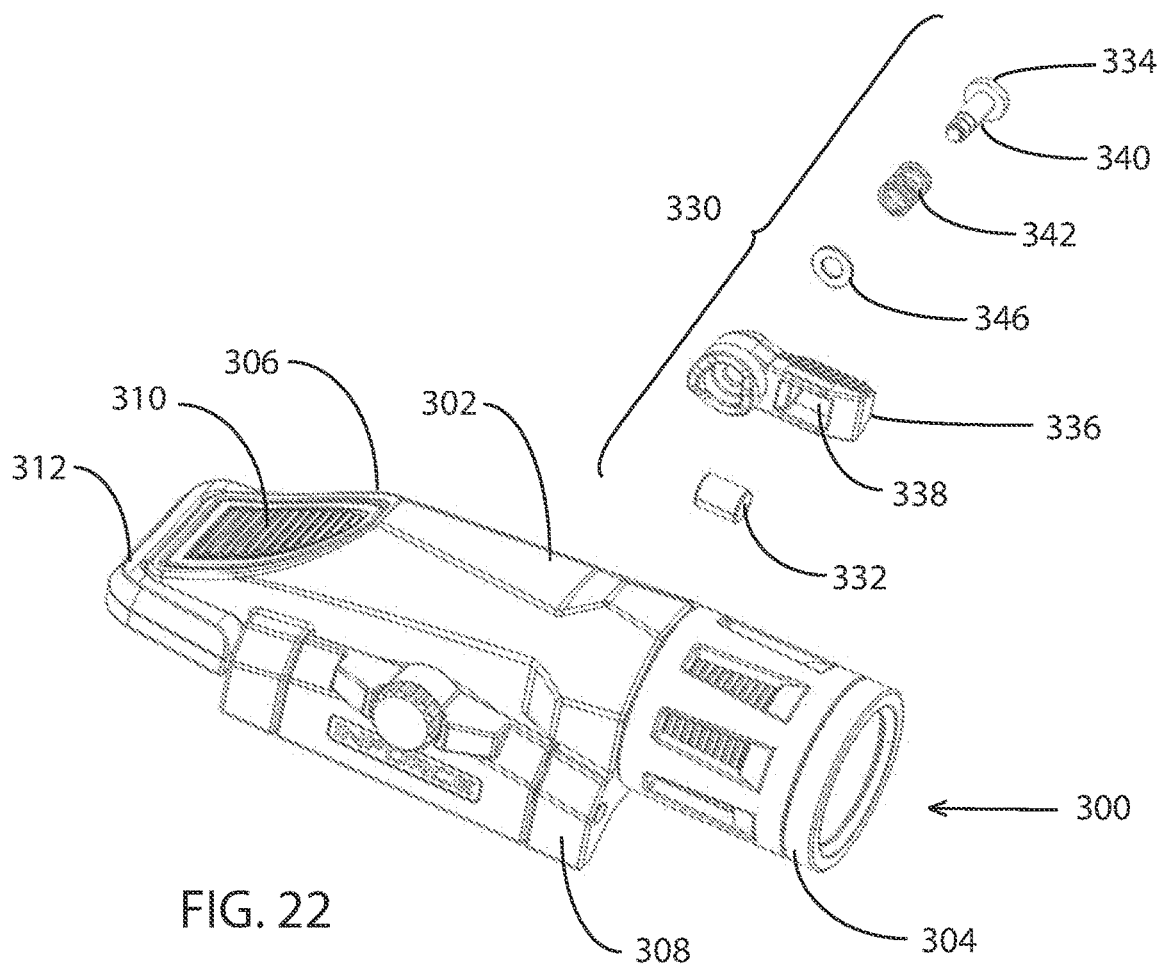
FIG. 22 is another exploded perspective thereof.

Turning now to FIGS. 17-19 it can be seen that the tail portion 306 of the body includes opposing outwardly facing cam surfaces 320 (only one side shown) each with a first pair of cam valleys 322 circumferentially located to position the safety bail 312 in the first (clear) position (FIG. 15), and a second pair of cam valleys 324 circumferentially located to position the safety bail 312 in the second (blocking) position (FIG. 16). The legs 316,318 of the safety bail include opposing inwardly facing cam followers 326 each with a pair of cam follower lobes 328 which cooperatively ride on the cam surfaces 320 and are seated within the valleys 322,324 in the respective clear and blocking positions. It can be seen that the cam lobes 328 on the bail legs 316,318 are positioned 180 degrees apart and that the two pairs of cam valleys 322,324 are circumferentially located about 90 degrees apart to provide the 90 degree offset positions. However, one skilled in the art can appreciated that the lobe and valley locations can be changed to suit the needs of operation and that they could in the illustrated embodiment, be between about 80 and about 120 degrees apart.

Turning to FIGS. 20-25, the flashlight 300 further comprises a selector switch 330 configured and arranged to control separate operational modes of said flashlight 300. As indicated above, this selector switch 300 is a bistable pivoting selector lever configured and arranged to control an internal selector switch for selecting operational modes of the flashlight. As described above, the preferred selector switch is a Hall effect sensor where a magnet 332 is located within the selector lever and is movable between positions that are adjacent to the internal sensor (not shown) (first operational mode) and remote from the internal sensor (second operational mode).

The bistable pivoting selector lever 330 has a central pivot body 334 and an actuator lever 336 extending therefrom. As noted above, the magnet 332 sits within a cavity 338 in the backside of the lever 336. The central pivot body 334 and the flashlight body 302 include cooperative bistable cam elements which provide bistable rotation of the selector lever 330 between a first position (FIG. 15) wherein the flashlight operates in a first operational mode (white light), and a second position (FIG. 20) wherein the flashlight operates in a second operational mode (IR light). The selector lever assembly 330 further includes an axial pivot pin 332 extending through the pivot body 334 and secured within the flashlight body. In this regard, the pivot pin 340 is a similar plastic material and is ultrasonically welded to the housing 302 during assembly. The selector lever assembly 330 further includes an axial load spring 342 captured between the pivot body 334 and a head portion 344 of the pivot pin 340. Additionally, a metal washer 346 is positioned within the pivot body 334 to reduce friction between the spring 342 and the plastic as the pivot body 334 rotates. The axial spring 342 provides an inward axial spring bias during rotation of the selector lever 330 to urge the bistable cam elements into the respective first and second positions.

Figure 23:
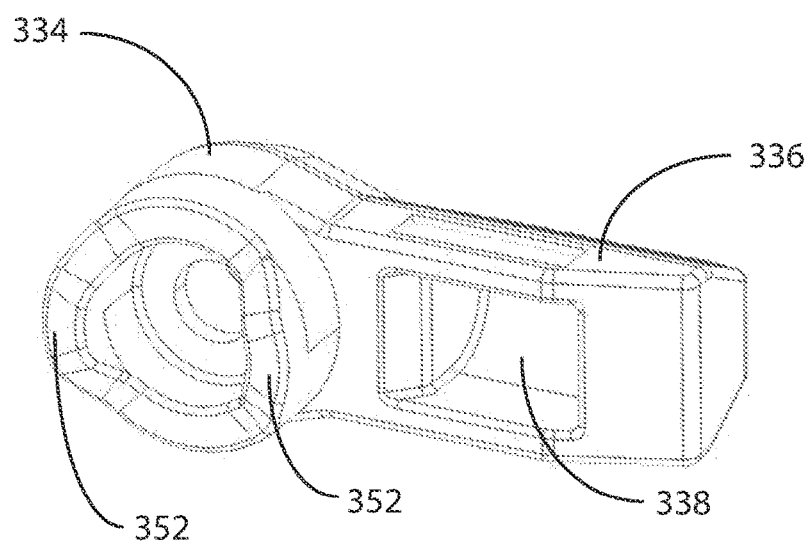
FIG. 23 is a perspective view of the rear side of the bistable pivot lever showing the magnet recess and the bistable cam follower surfaces.
Figure 24:
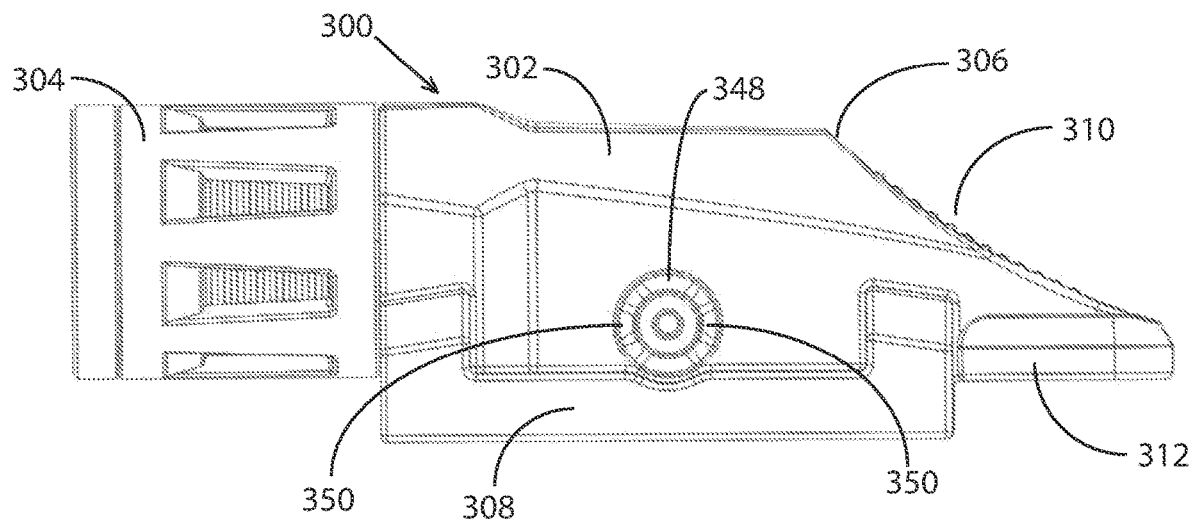
FIG. 24 is a side view of the flashlight housing showing the bistable cam surfaces molded into the flashlight housing.
Figure 25:
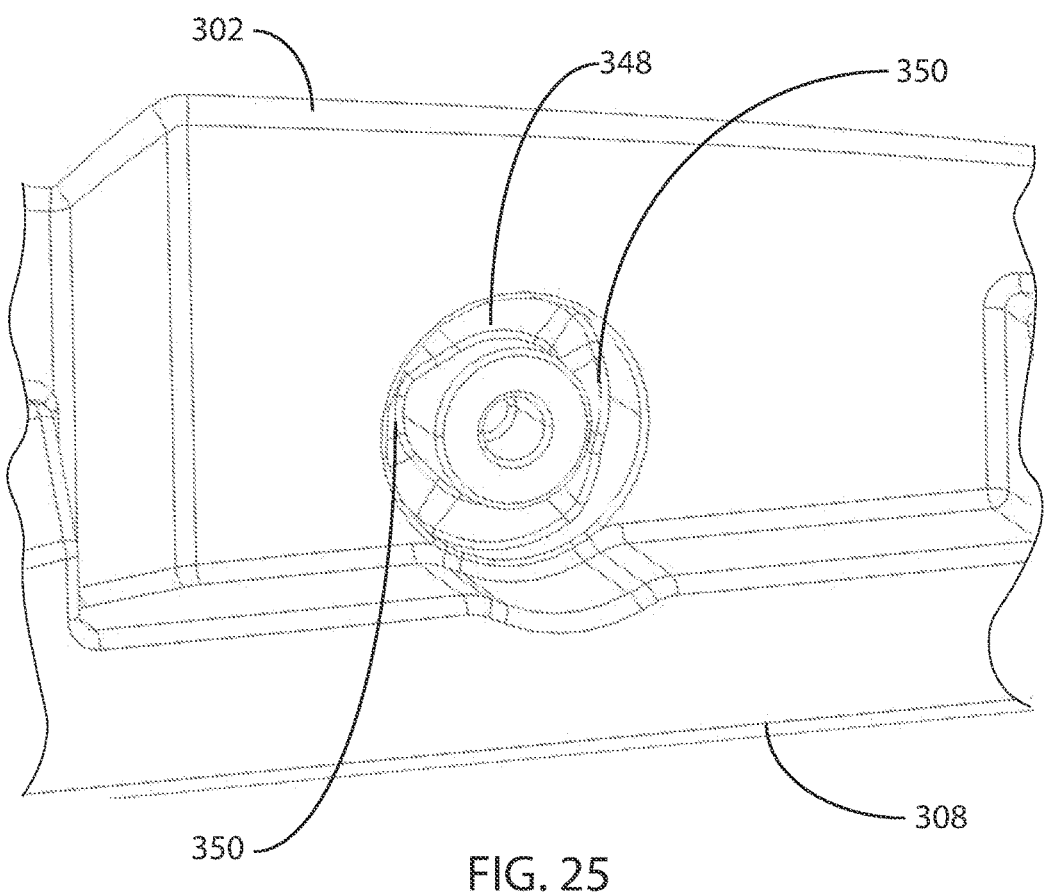
FIG. 25 is an enlarged perspective view of the cam surfaces.

Turning to FIGS. 23-25, the flashlight body 302 includes opposing outwardly facing cam surfaces 348 each with a pair of cam valleys 350 circumferentially located in diametrically opposed positions to locate the selector lever 330 in both the first and second positions. Referring to FIG. 23, the pivot body 334 of the selector lever 330 includes a pair of inwardly facing cam follower lobes 352 which cooperatively ride on the cam surfaces 348 and are seated within the valleys 350 in the respective first and second positions. It can be seen that the first and second positions are 180 degrees apart. However, one skilled in the art will appreciate that the lobe and valley positions can be altered according to functional need.

Figure 26:
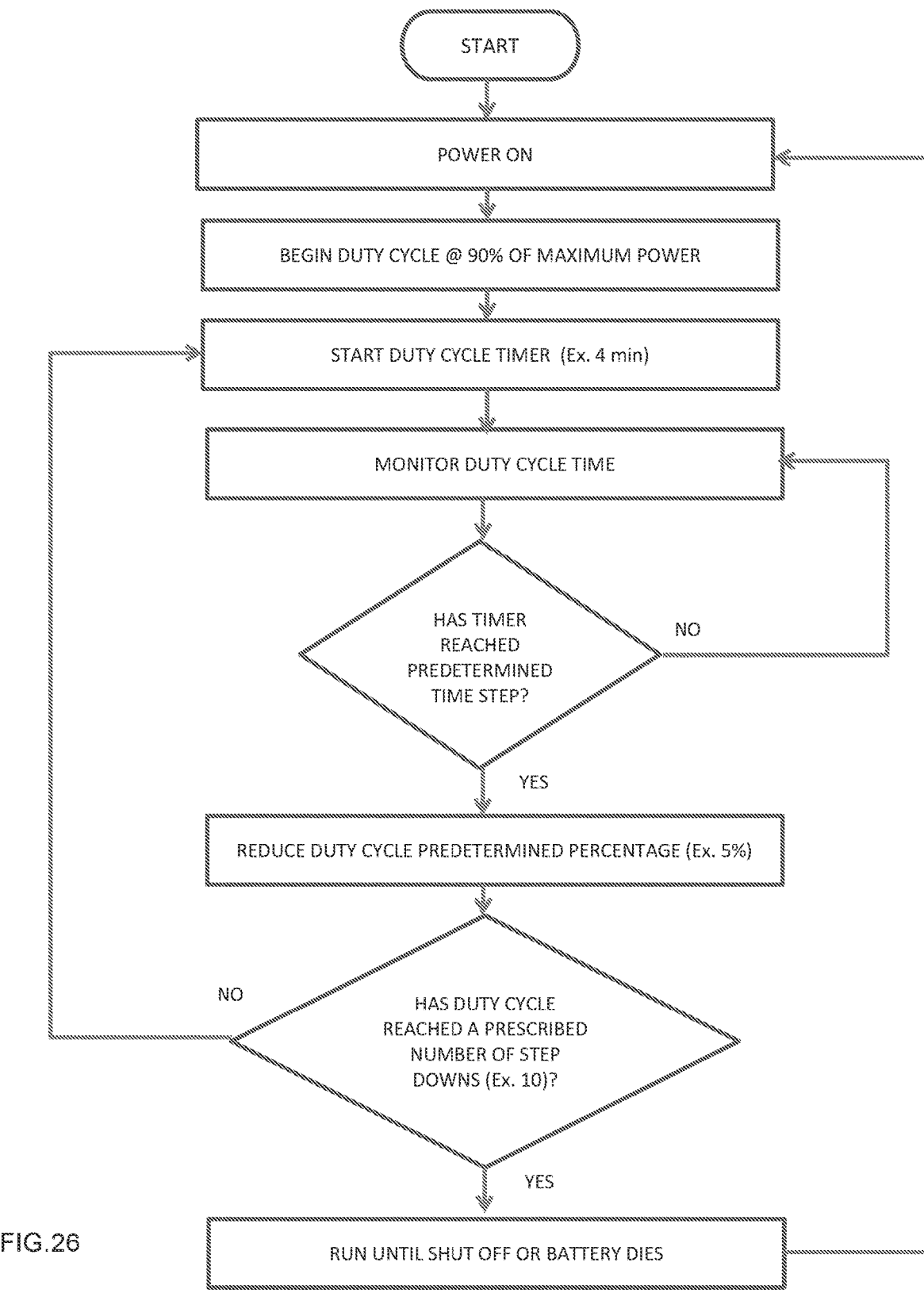
FIG. 26 is a flow chart illustration of a novel operating method for the present flashlight.

Turning to FIG. 26, there is illustrated a flow chart describing a unique thermal optimization method for the flashlight. As LED lights are operating at higher and higher brightness, the heat from the LED is getting higher and higher. Most of the time a weapon light is only turned on for a short time and the heating issue is not a problem. However, if the user turns the light on and leaves it on, the high brightness will eventually overheat the LED causing reduced brightness and possible damage to the LED. The present invention employs a unique thermal optimization method that slowly reduces power to the LED without any noticeable change in brightness to the user.

As described above, the present flashlights employ a first circuit board 30 with an LED mounted thereon, a second circuit board 56 having a switch and a microprocessor (not shown). The first and second circuits are connected by a circuit extending therebetween. In this case, the circuit boards are connected directly by the battery. The microprocessor is configured and arranged to control operation of the LED by sending Pulse Width Modulation (PWM) signals to the first circuit board (LED) through the battery.

As seen in FIG. 25, when the flashlight is first powered on, it begins a PWM duty cycle at a percentage of the maximum duty cycle (for example 90%). The programming then starts a duty cycle timer and monitors the duty cycle time for a prescribed time period (for example 4 minutes). If the flashlight were left running at a 90% duty cycle, the LED's junction temperature would slowly rise causing a degradation in lumen performance. To compensate, the method monitors time until the duty cycle time has reached a predetermined time period (i.e. 4 minutes as above). If the time period is reached, the programming reduces the duty cycle a predetermined percentage (for example 5%). The software then determines if a predetermined number of duty cycle step downs have occurred (for example 10). If no, the programming resets the duty cycle timer and begins the loop again. When the last step down is performed, the circuit will run at the prescribed steady state duty cycle until powered off or until the battery is exhausted. In either case, when the flashlight is next powered on, it starts the cycle again fresh at a 90% duty cycle. In this manner, the flashlight is operated at near maximum lumen output and the temperature is controlled without any noticeable difference in brightness to the user. The reduction in duty cycle increases LED life, conserves battery power and increases life cycle of the battery.

Accordingly, it can be seen that the present invention provides a flashlight including a bistable safety bail to prevent inadvertent depression of an operational push button switch and a bistable pivoting mode selection lever which controls operational modes of the flashlight. Further, the flashlight operates with a thermal optimization circuit which automatically, over time, reduces a duty cycle of the control circuit to reduce the temperature of the LED junction, improving LED performance and increasing battery life. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims

What is claimed:

1. A multi-function flashlight comprising:
a primary light source;
a plurality of secondary light sources;
a reflector having an aperture at a rearward end thereof, said primary and secondary light sources being received within said aperture,
wherein said primary light source is centrally located within said aperture, and said plurality of secondary light sources are concentrically located about the primary light source,
wherein said primary light source is positioned such that output therefrom passes above the plurality of secondary light sources, and is captured and projected forward by a surface of said reflector, and
wherein output from said plurality of secondary light sources is directed forward such that the output therefrom does not impinge on the reflector surface;
a selector switch for selecting an operating mode; and
an energizing switch for selectively energizing said light sources based on said operating mode selected by the selector switch.

2. The multi-function flashlight of claim 1 further comprising:
a housing having an integrated interface for attachment to a firearm.

3. The multi-function flashlight of claim 2 further comprising:
an interface lock to prevent accidental disengagement of said interface from said firearm.

4. The multi-function flashlight of claim 3 wherein the interface is a clamp and the interface lock is a screw that when engaged prevents opening of said clamp.

5. The multi-function flashlight of claim 2 wherein said reflector is a heat sink.

6. The multi-function flashlight of claim 5, wherein the selector switch includes a magnet therein, said magnet opening a Hall Effect sensor in said second circuit to indicate a first operating mode when said selector switch is positioned in a first position and closing said Hall Effect sensor to indicate a second operating mode when said selector is in a second position.

7. The multi-function flashlight of claim 2, wherein the selector switch includes a magnet therein, said magnet opening a Hall Effect sensor in said second circuit to indicate a first operating mode when said selector switch is positioned in a first position and closing said Hall Effect sensor to indicate a second operating mode when said selector is in a second position.

8. The multi-function flashlight of claim 1 wherein said reflector is a heat sink.

9. The multi-function flashlight of claim 1, wherein the selector switch includes a magnet therein, said magnet opening a Hall Effect sensor in said second circuit to indicate a first operating mode when said selector switch is positioned in a first position and closing said Hall Effect sensor to indicate a second operating mode when said selector is in a second position.

10. The multi-function flashlight of claim 1 wherein said primary light source and said plurality of secondary light sources are diode light sources.

11. The multi-function flashlight of claim 10, wherein said primary diode light source and said plurality of secondary diode light sources are mounted in adjacent relation on a common circuit substrate.

* * * * *